(12) United States Patent
Guichard et al.

(10) Patent No.: US 10,600,170 B2
(45) Date of Patent: Mar. 24, 2020

(54) METHOD AND DEVICE FOR PRODUCING A DIGITAL IMAGE

(71) Applicant: DXO LABS, Boulogne Billancourt (FR)

(72) Inventors: Frédéric Guichard, Paris (FR); Benoît Chauville, Paris (FR)

(73) Assignee: DXO LABS, Boulogne-Billancour (FR)

( * ) Notice: Subject to any disclaimer, the term of this patent is extended or adjusted under 35 U.S.C. 154(b) by 0 days.

(21) Appl. No.: 15/737,721

(22) PCT Filed: Jun. 16, 2016

(86) PCT No.: PCT/EP2016/063897
§ 371 (c)(1),
(2) Date: Dec. 18, 2017

(87) PCT Pub. No.: WO2016/202926
PCT Pub. Date: Dec. 22, 2016

(65) Prior Publication Data
US 2018/0197282 A1   Jul. 12, 2018

(30) Foreign Application Priority Data
Jun. 18, 2015   (FR) ..................................... 15 55595

(51) Int. Cl.
*G06T 5/50* (2006.01)
*H04N 5/235* (2006.01)
*H04N 5/217* (2011.01)

(52) U.S. Cl.
CPC .............. *G06T 5/50* (2013.01); *H04N 5/217* (2013.01); *H04N 5/2355* (2013.01); *G06T 2207/10004* (2013.01)

(58) Field of Classification Search
CPC . G06T 5/50; G06T 2207/10004; H04N 5/217; H04N 5/2355; H04N 21/25833
(Continued)

(56) References Cited

U.S. PATENT DOCUMENTS

| 3,398,634 A | 8/1968 | McLachlan, Jr. |
| 2008/0130987 A1* | 6/2008 | Stokes ..................... H04N 1/60 382/162 |

(Continued)

FOREIGN PATENT DOCUMENTS

WO   2012/170111 A1   12/2012

OTHER PUBLICATIONS

Mertens et al., "Exposure Fusion," PG '07 Proc. 15th Pacific Conf. on Computer Graphics and Applications, Oct. 29-Nov. 2, 2007, p. 382-390, IEEE Computer Society, Washington, DC, USA.

(Continued)

*Primary Examiner* — Marnie A Matt
(74) *Attorney, Agent, or Firm* — Im IP Law; Chai Im; C. Andrew Im

(57) ABSTRACT

A method for automatically producing a digital image includes selecting at least one capture mode for capturing at least two image signals from an image capture device. The image capture device captures at least two image signals of the same scene in a RAW format, each image signal being captured according to the image capture mode. A file in a standardized format comprising each image signal and metadata representative of the capture mode is generated and stored. The created file is digitally processed by selecting at least one processing algorithm to process at least two image signals according to the metadata representative of the capture mode, and by fusing at least two image signals according to each chosen image processing algorithm into a fused digital image signal.

10 Claims, 3 Drawing Sheets

(58) Field of Classification Search
USPC .......................................................... 348/43
See application file for complete search history.

(56) References Cited

U.S. PATENT DOCUMENTS

| | | | |
|---|---|---|---|
| 2008/0292300 A1* | 11/2008 | van der Veen | G03B 17/24 396/311 |
| 2010/0014718 A1* | 1/2010 | Savvides | G06K 9/00597 382/117 |
| 2011/0176024 A1* | 7/2011 | Kwon | H04N 5/23232 348/222.1 |
| 2011/0234841 A1* | 9/2011 | Akeley | H04N 5/232 348/222.1 |
| 2012/0249550 A1* | 10/2012 | Akeley | H04N 5/232 345/419 |
| 2014/0240549 A1 | 8/2014 | Seshadrinathan et al. | |
| 2015/0078661 A1* | 3/2015 | Granados | G06T 5/009 382/167 |
| 2017/0076430 A1* | 3/2017 | Xu | H04N 5/76 |
| 2018/0288311 A1* | 10/2018 | Baghert | H04N 5/23219 |
| 2018/0352134 A1* | 12/2018 | Sun | H04N 5/35581 |

OTHER PUBLICATIONS

Shah et al., All Smiles: Automatic Photo Enhancement by Facial Expression Analysis, CVMP '12 Proc. 9th European Conference on Visual Media Production, Dec. 5-6, 2012, p. 1-10, Decemb https://sites.google.com/site/allsmilespaper.
Chen et al., "Automatic Generation of Action Sequence Images from Burst Shots," Jun. 5, 2013, https://stacks.standford.edu/.../Chen_Stabler_Stanley_Action_Sequence_Generation.pdf.

* cited by examiner

METHOD AND DEVICE FOR PRODUCING A DIGITAL IMAGE

RELATED APPLICATIONS

This application is a § 371 application from PCT/EP2016/063897 filed Jun. 16, 2016, which claims priority from French Patent Application No. 15 55595 filed Jun. 18, 2015, each of which is incorporated herein by reference in its entirety.

FIELD OF THE INVENTION

The present invention is aimed at a method and a device for producing a digital image.

The present invention applies to the field of digital image processing.

More particularly, the present invention applies to the field of processing signals representative of images in a RAW format.

BACKGROUND OF THE INVENTION

Signals representative of images captured by a digital sensor must be processed and converted to the JPEG (acronym of "Joint Photographic Experts Group") format to be capable of being viewed. Such a conversion involves a loss of information contained in the signal representative of the image captured at the sensor output. The quality of the image is also reduced due to passing from a format coded over a number greater than eight bits, such as twelve or fourteen bits, for example, to the JPEG format coded over eight bits.

There are image capture means capturing at least two signals representative of images in a RAW format then each signal representative of an image undergoes an image processing independently of the others. Then the images are combined, and the combination of images is converted to the JPEG format.

Capture means for capturing at least two signals representative of images allow a conversion of each signal representative of an image which undergoes image processing, then each processed image is converted into a format configured for being displayed on a screen, such as the JPEG format or the TIFF (acronym of "Tagged Image File Format") format. This conversion involves a loss of information. Once the conversion is performed, the images are stored and combined into an image in the JPEG format. There is therefore a double loss of information and quality, the first at the time of converting the images and the second at the time of combining the images. This loss of information limits the possible post-processing.

Other image capture devices capture at least two signals representative of images in a RAW format. The signals representative of images may undergo TNR (acronym of "Temporal Noise Reduction") processing or HDR (acronym of "High Dynamic Range") processing, for example. The images are combined during this processing. The combination causes a loss of information, notably the quantity of combined pixels and the way in which the combination has been performed. The combined image is then processed by means of an ISP (acronym of "Image Signal Processor") then stored. The combined image may undergo post-processing by means of specialized software. However, this loss of information limits the possible post-processing. For example, a noise reduction post-processing algorithm does not have access to noise characteristics that depend for each pixel on the quantity of combined pixels and the way in which the combination has been performed.

A TNR algorithm is notably disclosed in the publication "A High-Quality Video Denoising Algorithm based on Reliable Motion Estimation" by C. Lieu and W. Freeman. The disclosed TNR denoising algorithm is an algorithm for denoising by patch by applying a method of the k nearest neighbors which seeks similar patches in a neighborhood the size of which may be the size of an image.

The processing of a set of signals representative of images is a process the complexity of which is far superior to the processing of a single signal representative of an image. The processing of a plurality of signals representative of images may multiply the complexity of the algorithms by the number of processed images. The computing power of digital movie cameras and digital still cameras is limited is the algorithms generally used with a single image are not executable in a reasonable time, unless image quality is sacrificed by using a less complex algorithm.

In the case of HDR processing, fusing a set of signals representative of images into a single image makes it possible to create an image the dynamic of which is far superior to the dynamic of each initial image. This dynamic is often not representable in the algorithms embedded in the ISPs integrated in digital movie cameras and still cameras. The image is generally quantized for reducing the dynamic of the image and allowing its processing by the ISP.

An HDR algorithm is notably disclosed in the publication "Exposure Fusion" by T. Mertens et al. The HDR algorithm fuses a sequence of images the exposure of which varies between predetermined limit values for obtaining a high quality image without converting prior use of another HDR algorithm.

The publication "All Smiles: Automatic Photo Enhancement by Facial Expression Analysis" by R. Shah and V. Kwatra discloses a system of automatic enhancement of photographs by facial expression analysis in different images. The algorithm assigns a score to each image, and in the image with the highest score faces with low scores are replaced by faces with high scores included in other images.

Patent application U.S. Pat. No. 3,398,634 A discloses a method for having a clear image by stacking clear parts of images. "Focus stacking" algorithms are also known in the prior art.

The publication "Automatic Generation of Action Sequence Images from Burst Shots" by S. Chen, et al. discloses a fusion algorithm for fusing images in which objects are in different locations between each image. The algorithm makes it possible to display the objects in different locations in the fused image or to remove the objects from the fused image.

There is also post-processing software on computer, notably the Adobe LIGHTROOM® (registered trademark) software package, which takes a plurality of images at the input in a RAW format. The user may then manually control an HDR processing on the images. The software is incapable of automatically selecting a processing to be applied, such as a TNR or HDR algorithm, for example.

There are also digital cameras marketed by LYTRO® (registered trademark), making it possible to refocus an image after the image has been captured. The device a single image produced by a special optic.

The Digital Camera Utility (registered trademark) software makes it possible to compose an image from a plurality of signals representative of images in a RAW format, through an HDR algorithm. This software is incapable of automatically selecting a processing to be applied, such as a TNR or HDR algorithm, for example.

Finally, the DNG (acronym of "Digital Negative") format makes it possible to store a plurality of signals representative of images, such as the signal representative of an original image in a RAW format of the manufacturer and the RAW format converted into DNG.

The DNG format includes a signal representative of a digital image in a standardized format and a set of capture metadata of the signal in a standardized format. The DNG format comprises free fields in which signals representative of additional images or metadata may be recorded. The specification of the DNG format states that the DNG image format is based on the TIFF image format. The DNG format is compatible with the TIFF format. The TIFF format makes it possible to store images supplementary to a main image. However, the TIFF format has a limited size which limits the number of supplementary images that can be stored in a file in the TIFF format. The supplementary images are stored by means of an EXIF (acronym of "Exchangeable Image File Format") subIFD (acronym of "Image File Directory") metadata tag.

The aforementioned devices involve a loss of information on the combination of signals representative of images and a decrease in the quality of the image. The aforementioned devices are unsuitable for an automatic application of suitable high-quality processing, such as TNR or HDR processing, for example, to the captured images and to the capture mode of these images.

OBJECT AND SUMMARY OF THE INVENTION

The present invention is aimed at remedying all or part of these drawbacks.

For this purpose, according to a first aspect, the present invention is aimed at a method for automatically producing a digital image which comprises the following steps:
- selecting at least one capture mode for capturing at least two raw signals representative of a digital image from an image capture device,
- capturing by the image capture device of at least two raw signals representative of digital images of the same scene in a RAW format, each raw signal representative of a digital image being captured according to the image capture mode,
- creating a file in a standardized format comprising each raw signal representative of a digital image and metadata representative of the capture mode,
- storing the created file,
- digitally processing the created file comprising the following substeps:
  - choosing at least one processing algorithm for processing at least two raw signals representative of an image according to the metadata representative of the capture mode,
  - fusing at least two raw signals representative of digital images according to the chosen image processing algorithm into a signal representative of a fused digital image.

Thanks to these provisions, the file comprises all the information necessary for fusing images according to the capture mode: each raw signal representative of a captured image and the metadata representative of the capture mode. These metadata make it possible to choose the processing to be applied and the processing parameters according to the signals representative of captured images and the capture mode.

Fusing raw signals representative of images makes it possible to recreate in post-processing the image visible to the user with a better quality. The capture of at least two raw signals representative of images reveals an overall displacement of the image capture device as well as the local displacement of objects in the captured scene. The represented images appear shifted relative to each other or the local displacements of the objects reveal or hide parts of the scene in the represented images. Fusion requires intensive calculations for detecting movement and readjusting the images or saving the objects that have moved over a single one of the images before fusion in order to avoid ghost images. The presence of all the necessary information in the file allows a more complex automatic post-processing and managing movement much better. The image is of better quality for processing such as that claimed than for processing embedded in capture devices. Embedded processing is simplified for limiting the surface area and therefore the cost of the image processing component and the power consumption.

Consequently, processing raw signals representative of images in a RAW format makes it possible to use the information contained in each raw signal representative of an image and to add metadata concerning the processing performed on each signal. Processing a raw signal representative of a fused digital image may also use the metadata concerning the fusion for improving the processing performed.

Storage of the created file makes it possible to save the raw signals representative of images in a RAW format for post-processing each raw signal representative of an image individually.

The use of a standardized format allows a user to perform image processing by means of specialized software without resorting to a prior conversion.

Finally, selecting a capture mode and choosing at least one image processing algorithm according to metadata representative of the capture mode makes it possible to adapt the processing of the images to be fused and to obtain a fused image of better quality. By implementing HDR processing, through a processing step and processing means outside the image capture device, the processing may be performed over a large dynamic e.g. 32 bits which allows a better quality of image by eliminating the quantization usually used in capture devices for limiting the surface area and therefore the cost of the image processing component and the power consumption. Each different processing algorithm uses at least partly the information present in a raw signal representative of a very high dynamic image. The effects of quantization in modifying the exposure of the image are avoided, for example. In addition, the complexity of the processing algorithms implemented is not limited by the processing capacity of the processing means.

In some embodiments, the capture mode of a raw signal representative of an image is selected manually by a user of the image capture device or automatically according to an exposure measurement and/or a focusing measurement by the image capture device, the capture mode comprising exposure and/or focusing parameters for each raw signal representative of an image.

The advantage of these embodiments lies in suiting the capture mode of each raw signal to the specific data of the scene to be captured in order to obtain a high quality image.

In some embodiments, the capture mode of a raw signal representative of an image is selected from at least one element of the following group:

noise reduction using at least two raw signals representative of an image, dynamic increase using at least two raw signals representative of an image, increase or decrease of depth of field using at least two raw signals representative of an image, if the scene comprises at least one face, increase in quality at each face using at least two raw signals representative of an image or breakdown of a movement represented in using at least two raw signals representative of an image.

The advantage of these embodiments lies in having an image in a displayable, high quality format, the processing of which is suited to the scene to be represented.

In some embodiments, the method forming the subject matter of the present invention further comprises a selection step for selecting a raw signal representative of a "reference" image from the raw signals representative of captured images on which at least one other raw signal representative of an image is fused, subsequent to the capture step.

For example, in the case of the noise reduction mode, and in the case where the main subject has moved, it is possible to choose as a reference image the image where the subject has the least motion blur, the ghost images of the blurred subject on the other images then being eliminated.

These embodiments make it possible to select the raw signal representative of a better quality image in order to increase the final quality of the raw signal representative of a fused image.

In some embodiments, in the course of the capture step for capturing at least two raw signals representative of images, at least two raw signals representative of images are captured successively.

These embodiments allow a user to capture two raw signals representative of an image with a change in exposure or focusing, between the two captures of raw signals representative of images, for example.

In some embodiments, the standardized format of the file is based on the DNG (acronym of "Digital Negative") format.

The DNG format makes it possible to store metadata and a plurality of raw signals representative of an image in a RAW format.

In some embodiments, the method forming the subject matter of the present invention further comprises a step of transmitting the created file.

The advantage of these embodiments lies in transmitting the created file to image processing means for a subsequent and different use or for using more efficient remote computing means notably Internet servers or a personal computer, for example.

According to a second aspect, the present invention is aimed at a device for automatically producing a digital image which comprises:

selection means for selecting at least one capture mode for capturing at least two raw signals representative of a digital image from an image capture device, an image capture device, capturing at least two raw signals representative of digital images of the same scene in a RAW format, each raw signal representative of a digital image being captured according to the image capture mode, creation means for creating a file in a standardized format comprising each raw signal representative of a digital image and metadata representative of the capture mode, storage means for storing the created file, digital processing means for processing the created file comprising the following substeps:

choosing means for choosing at least one processing algorithm for processing at least two raw signals representative of an image according to the metadata representative of the capture mode, fusion means for fusing at least two raw signals representative of digital images according to each chosen image processing algorithm into a signal representative of a fused digital image.

Since the advantages, purposes and particular features of the device forming the subject matter of the present invention are similar to those of the method forming the subject matter of the present invention, they are not recalled here.

In some embodiments, the device forming the subject matter of the present invention comprises transmission means for transmitting the created file.

The advantage of these embodiments lies in transmitting the created file to image processing means for subsequent and different use, for example.

BRIEF DESCRIPTION OF THE FIGURES

Other advantages, purposes and particular features of the invention will emerge from the non-restrictive description which follows of at least one particular embodiment of a method and a device for producing an image, referring to the appended drawings, in which.

DESCRIPTION OF EMBODIMENTS OF THE INVENTION

It should be noted that from now on the figures are not to scale.

The present description is given non-restrictively, each feature of an embodiment being capable of being combined with any other feature of any other embodiment in an advantageous manner.

In the rest of the description, the term "image signal" is used to designate a raw signal representative of a digital image.

It is recalled here that a RAW image format is a file format for digital images. This term derives from the word "raw". The file contains all the data recorded by the sensor and is often similar to a negative. The RAW image format is the designation of a certain type of file created by devices, such as digital cameras or scanners, for example.

It is recalled that a DNG (acronym of "Digital Negative") image format is an open format for recording raw signals generated by the sensors of digital image capture devices.

It is recalled that a "ghost image" corresponds to a fusion of at least two image signals capturing the same scene, an object of the captured scene having been displaced between the capture of the first image signal and the second image signal. The fusion of the two image signals leads to the representation of the object in the fused image in two different places. Such an image is referred to as a "ghost image".

It is recalled also that a "ghost map" is a signal obtained by comparing at least two image signals of the same scene indicating displacements of objects and their location each image signal. An "anti-ghost" is an algorithm for detecting objects displaced between at least two image signals of the same scene and for selecting a location from the captured locations of the object in each image signal. The object appears only once at the determined location.

Figure 1:
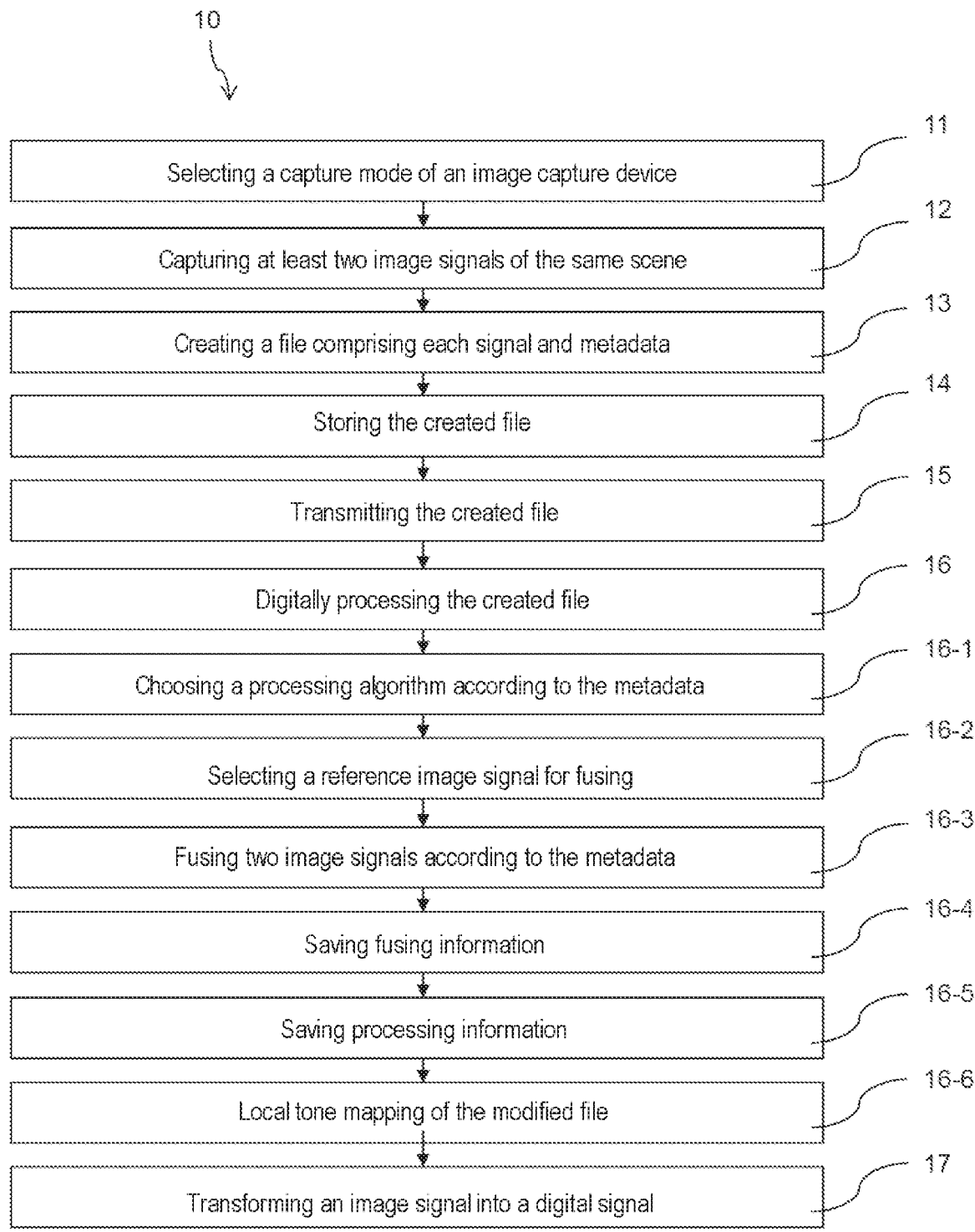
FIG. 1 represents, schematically and in the form of a flow chart, a first particular embodiment of a method forming the subject matter of the present invention.

FIG. 1 depicts a particular embodiment of a method 10 forming the subject matter of the present invention.

The method 10 for automatically producing a digital image 265 comprises the following steps:
- selecting 11 at least one capture mode 200 for capturing at least two image signals, 215 or 220, from an image capture device 205,
- capturing 12 by the image capture device 205 of at least two image signals, 215 and 220, representative of the same scene in a RAW format, each image signal, 215 and 220, being captured according to the image capture mode 200,
- creating 13 a file 225 in a standardized format comprising each image signal, 215 and 220, and metadata 230 representative of the capture mode 200,
- storing 14 the created file 225,
- digital processing 16 of the created file 225 comprising the following substeps:
  - choosing 16-1 at least one processing algorithm 245 for processing at least two image signals, 215 or 220, according to the metadata 230 representative of the capture mode 200,
  - fusing 16-2 at least two image signals, 215 and 220, according to each chosen image processing algorithm 245 into a signal representative of a fused digital image 255.

In the selection step 11, the capture mode for capturing an image signal is selected manually by a user of the device 205 or automatically by the device 205. Selecting 11 the capture mode for capturing an image signal may be performed according to an exposure measurement. Selecting 11 the capture mode for capturing an image signal, 215 or 220, may be performed according to a focusing measurement. Preferably, the capture mode 200 is selected by a user. Parameters, such as an effect selected on the image signal, 215 or 220, by the user, the exposure, or the number of image signals may be automatically selected according to the scene to be captured. Notably, according to the lighting, a displacement in the scene, or a distance between objects in the scene.

The capture mode for capturing an image signal 200 comprises exposure and/or focusing parameters for each image signal, 215 or 220.

The capture mode may be at least one of the following elements:
- a number of image signals, 215 and 220, and/or
- an effect on the image signal, 215 or 220, selected by a user, such as
  - a noise reduction of at least one image signal, 215 or 220, by fusion of image signals, 215 or 220, of the same exposure with anti-ghost, for example,
  - a dynamic increase of at least one image signal, 215 or 220, by fusion of image signals, 215 and 220, of a different exposure with anti-ghost, for example,
  - an increase or decrease of a depth of field, by fusion of image signals, 215 and 220, of a different focusing distance and/or aperture with anti-ghost, for example,
  - if the scene comprises at least one face, an increase in the quality of at least one image signal, 215 or 220, at each face, by facial analysis and selecting between at least two image signals, 215 and 220, of each face according to detection of a smile and detection of the eyes being open and/or;
  - a movement breakdown effect, by analysis of an object displacement between at least two image signals, 215 and 220, and selecting the differences between each image signal, 215 and 200, for saving the background of one of the images represented by the image signals, 215 and 220, at the locations or the object is absent in all the images and the object when it is present in one of the images and/or
- a variation in the exposure parameters from one image signal, 215 or 220, to another image signal, 215 or 220, such as:
  - the activation of a photographic flash for obtaining low noise in at least one image signal, 215 or 220, or the deactivation of a photographic flash for obtaining a better rendering of colors and noise in at least one image signal, 215 or 220,
  - maintaining the same exposure for applying a TNR algorithm configured for reducing the noise by increasing the dynamic of an image signal, 215 or 220, in a limited way and;
  - applying exposure compensation (or "EV bias") for applying an HDR algorithm configured for increasing the dynamic of an image signal, 215 or 220; and/or
- a variation in the focusing parameters between the capture of one image signal, 215 or 220, and the capture of a successive image signal, 215 or 220, such as:
  - a variation in the focusing distance, for a fusion algorithm configured for increasing or decreasing a depth of field, for example, and/or
- selecting a "reference" image signal, 215 or 220, for the fusing step 16-2.

Preferably, the noise reduction capture mode 245 for capturing at least one image signal, 215 or 330, corresponds to the capture of two to four consecutive images with the same exposure and same focusing distance. The exposure includes: the aperture, the shutter speed and the gain of the sensor, and the illumination of the flash where applicable.

Preferably, the dynamic increase capture mode 245 for capturing at least one image signal, 215 or 220, corresponds to the capture of two to four consecutive images with a variable exposure, such as a fixed aperture and a gain of the sensor but a variable shutter speed, at least one image being underexposed and at least one image being overexposed and with the same focusing distance.

In some embodiments, the dynamic increase capture mode 245 for capturing at least one image signal, 215 or 220, corresponds to the capture of two consecutive image signals, 215 or 220, with a variable exposure, the flash being activated for one of the captures and deactivated for the other, with the same focusing distance.

Preferably, the increase or decrease in depth of field capture mode 245 for capturing at least one image signal, 215 or 220, corresponds to the capture of two to six consecutive images with the same exposure and a variable focusing distance.

Preferably, the increase or decrease in depth of field capture mode 245 for capturing at least one image signal, 215 or 220, corresponds to the capture of two to four consecutive images with the same exposure and the same focusing distance.

Preferably, the capture mode 245 for capturing breakdown of a movement represented in at least one image signal, 215 or 220, corresponds to the capture of two to four consecutive images with the same exposure and the same focusing distance.

In some embodiments, at least two capture modes 245 are selected. For example, two image signals are captured with the same exposure and two image signals are captured with another exposure, the four images having the same focusing distance.

The capture step 12 is performed by an image capture device 205, such as a digital still camera or a digital movie camera, for example. The capture 12 is performed by image capture means 210 creating an image signal, 215 or 220. The image is the digital reproduction of a scene captured by a user. The capture 12 of at least two image signals, 215 and 220, is preferably such that each image signal, 215 or 220, is captured successively to the preceding one from the capture of the first image signal, 215 or 220. The number of image signals, 215 or 220, captured is two or four, for example.

In some embodiments, the image capture means 210 may comprise a plurality of image sensors. The image signals, 215 or 220, are captured by at least two image sensors 210. The image signals, 215 or 220, may be captured by at least two image sensors 210 simultaneously.

The image signals, 215 and 220, are in a RAW format. Preferably, the RAW format of the image signals, 215 and 220, is a DNG format. The image signal, 215 or 220, captured by the image capture means 210 is captured according to the selected capture mode 200.

Once the image signals, 215 and 220, are captured, a file 225 comprising each image signal, 215 and 220, is created in the creation step 13. The file 225 is created 13 in a standardized format. Preferably, the standardized format is the DNG format. The created file 225 comprises metadata 230, such as EXIF (acronym of "Exchangeable Image File Format") metadata.

The metadata 230 of the DNG format of the file 225 include parameters of an image. Preferably, metadata specific to each image signal, 215 and 220, are added to the metadata 230 of the created file 225. The added metadata 230 are the shutter speed, aperture and gain, flash and focusing distance parameters, for example.

In the embodiments in which the file 225 is in the DNG format, an image signal, 215 or 220, may be selected as the reference image signal in the course of a selection step 16-2 for selecting a reference image signal.

Each supplementary image signal, 215 or 220, may be a signal representative of a miniaturized image of the reference image signal, 215 or 220, or an image signal, 215 or 220, at least partially different from the reference image signal, 215 or 220.

Each image signal, 215 or 220, supplementary to the reference image signal, 215 or 220, is stored in a subIFD tag of the metadata 230 of the file 225.

Each image signal, 215 or 220, supplementary to the reference image signal, 215 or 220, may have different shooting parameters from the reference image signal, 215 or 220. The shooting parameters are the exposure time, the sensitivity of the image sensor 205 and/or the aperture of the image sensor 205, for example. The shooting parameters are stored in the metadata 230 of the file 225.

In embodiments in which each image signal, 215 or 220, supplementary to the image signal, 215 or 220, has the same shooting parameters as the reference image signal, 215 or 220, the image signals, 215 and 220, may share the same metadata 230 concerning the shooting.

In embodiments in which at least one supplementary image signal, 215 or 220, has different shooting parameters from the reference image signal, 215 or 220, each piece of information representative of the shooting parameters of each image signal, 215 or 220, may be stored in the metadata 230 of the file 225. Each piece of information representative of the shooting parameters of each image signal, 215 or 220, is preferably stored in a MakerNote tag. The MakerNote tag stores information in a format defined by the manufacturer of the device.

In some embodiments, the metadata 230 of the file 225 include a look-up table (or LUT, the acronym of "Look-Up Table") for each image signal, 215 and 220, of the file 225. Each look-up table is a table defining a decompression of each image signal, 215 or 220. Preferably, the look-up table of the reference image signal, 215 or 220, is stored in an EXIF tag referred to as a RawLinearizationLUT. Each look-up table of each supplementary image signal, 215 or 220, is stored in a MakerNote tag. The standard tag is interpreted by the existing image processing software.

Once the file 225 is created, the file 225 is stored 14. The file 225 may be stored 14, or recorded, in storage means 310 included in a device 30 for producing an image 265. In some embodiments, the storage step 14 is performed by means of a telecommunication network or connection means. The telecommunication network may be:
  a BLUETOOTH® (registered trademark) network,
  a WIFI® (acronym of "Wireless Fidelity", registered trademark) network,
  a mobile telephony network or
  an NFC (acronym of "Near Field Communication") network, for example.

The connections means may be:
  a USB connector,
  a Lightning (registered trademark) connector or
  a micro-USB connector, for example.

The method 10 may comprise a step of transmitting 15 the created file. The transmission 15 may be:
  a transmission by FTP ("File Transfer Protocol"),
  a transmission by mobile telephony network,
  a transmission by a Bluetooth (registered trademark) network,
  a transmission by a WiFi (acronym of "Wireless Fidelity", registered trademark) network,
  a transmission by a USB connector,
  a transmission by a Lightning connector or
  a transmission by an NFC (acronym of "Near Field Communication") network, for example.

The created file 225 may be transmitted 15 to image processing means, for example.

The created file 225 is processed at the digital processing step 16 for processing the created file 225. The processing step 16 comprises the following substeps:
  choosing 16-1 at least one processing algorithm 245 for processing at least one image signal, 215 or 220, according to the metadata 230 representative of the capture mode 200,
  fusing 16-3 at least two image signals, 215 and 220, according to each image processing algorithm 245 into a signal representative of a fused digital image 255.

The digital processing step 16 may comprise at least one of the following substeps:
  choosing at least one part of an image signal, 215 or 220, of a file 225 to be fused with one part of another image signal, 215 or 220, of the same file 225, after fusing, 16-3, saving 16-4 at least one piece of information representative of the fusing 16-3 performed, in the created file 225 and after processing, saving 16-5 at least one piece of information representative of the processing 16 performed, in the created file 225.

In the course of choosing 16-1 at least one processing algorithm 245, choices are made by choosing means such as a microprocessor, for example, for defining whether pixels of an image signal, 215 or 220, must be added, displaced, or eliminated from another image signal, 215 or 220.

The fusing 16-3 of at least two image signals, 215 and 220, included in the created file 225, into a fused image signal 245 comprising metadata 230, is performed according to each chosen processing algorithm 245. The fusing 16-3 depends on the choices made in the choosing step 16-1. The fused image signal 255 is in a RAW format, preferably the DNG format.

A comparison of each image signal, 215 or 220, in the fusing step 16-3 may reveal a displacement of the image capture device or a displacement of an object in the captured scene, for example. The fusing step 16-3 may comprise a step of creating a ghost map identifying differences between the image signals, 215 and 220, for applying at least one processing algorithm 245. Saving the information relating to fusion makes it possible to improve the subsequent spatial denoising (or "ghost map"), for example.

In embodiments in which the fusing 16-3 is performed according to a TNR denoising algorithm 245, the TNR denoising algorithm 245 is adapted for each pixel represented in the fused image signal 255, according to the created ghost map.

In the saving step 16-4, at least one piece of information concerning the transformations undergone, in the fusing 16-3, by at least one pixel of the image signal, 215 or 220, is saved in the form of a ghost image signal in the created file 225. Preferably, all the information representative of the fusing 16-3 is saved.

For example, the fusing information may indicate regions of the image in which the pixels were almost identical, such regions require little image processing.

The processing algorithm 245 for processing an image signal, 215 or 220, may be:

a denoising algorithm for denoising at least one part of the fused image signal 245, a dematrixing algorithm for dematrixing at least one part of the fused image signal 245, a rematrixing algorithm for rematrixing at least one part of the fused image signal 245 and/or a pixel correction algorithm for correcting the pixels of at least one part of the fused image signal 245, a noise reduction algorithm for reducing the noise of at least one image signal, 215 or 220, by fusion of image signals, 215 or 220, of the same exposure with anti-ghost, for example, a dynamic increase algorithm for the dynamic increase of at least one image signal, 215 or 220, by fusion of image signals, 215 and 220, of a different exposure with anti-ghost, for example, an algorithm for increasing or decreasing a depth of field, by fusion of image signals, 215 and 220, of a different focusing distance and/or aperture with anti-ghost, for example, if the scene comprises at least one face, an algorithm for increasing the quality of at least one image signal, 215 or 220, at each face, by facial analysis and selecting between at least two image signals, 215 and 220, of each face according to detection of a smile and detection of the eyes being open and/or;

a movement breakdown algorithm, by analysis of an object displacement between at least two image signals, 215 and 220, and selecting the differences between each image signal, 215 and 200.

The method 10 may comprise a selection step 16-2 for selecting a "reference" image signal from the captured image signals on which at least one other image signal is fused. Preferably, the selection step 16-2 for selecting an image signal is subsequent to the capture step 12 and prior to the fusing step 16-3.

The processing 16 of at least one image signal, 215 or 220, of the file 225 is preferably performed on a computer or mobile device. It may be performed by a non-specialized processor, a graphics processor, and/or a processor specializing in image processing or ISP (acronym of "Image Signal Processor").

Saving 16-5 at least one piece of information representative of the processing 16 may be performed, in the created file 225. Such saving 16-5 makes it possible to obtain a similar image from the image signals, 215 and 220, in a RAW format contained in the file 225.

The processing step 16 may comprise TNR (acronym of "Temporal Noise Reduction") noise reduction and HDR (acronym of "High Dynamic Range") high dynamic range steps performed on the fused and processed image signal 255. The fused and processed image signal 255 is in a RAW format, preferably the DNG format.

Preferably, the reference image signal, 215 or 225, selected in the selection step 16-2 is the image signal restored in a TNR noise reduction step, for example. The HDR high dynamic range step, may comprise a selection step for selecting at least two image signals, 215 or 220, of the file 225 to be processed.

The processing 16 of at least two image signals, 215 and 220, is according to the metadata 230 of the file 225 representative of the capture mode 200. For example, the fusing information may indicate regions of the image in which pixels of the image require greater processing 16.

In some embodiments, the processing 16 is a high dynamic processing.

Once the modification step has been performed, a local tone mapping step 16-6 is implemented on the processed and fused image signal 255. The color palette of the modified image signal 255 is mapped with a color palette, such as the color palette of an RGB (acronym of "Red, Green, Blue") format. Such a step makes it possible to convert a high dynamic range image to a more limited dynamic image. The image signal 260 after the local tone mapping step 16-6 is in a RAW format, preferably the DNG format.

After the local tone mapping 16-6, the image signal 260, having undergone the local tone mapping 16-6, is transformed into a digital image 265 in a transformation step 17. The digital image 265 is in a format that is displayable on a digital screen, such as a JPEG, TIFF or PNG format, for example.

Figure 2:
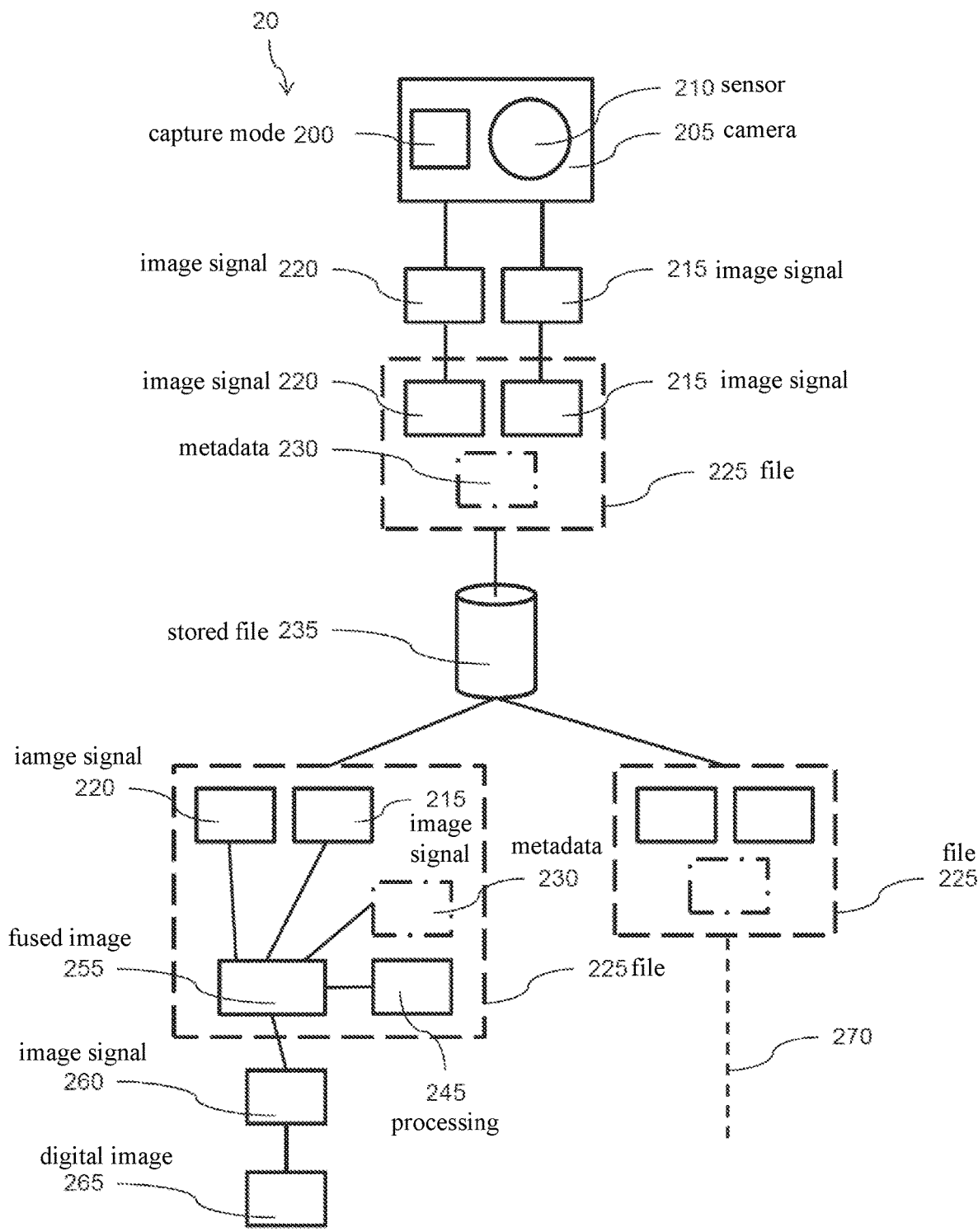
FIG. 2 represents, schematically of various components of the device performing a second particular embodiment of method forming the subject matter of the present invention

FIG. 2 depicts schematically of various components of the device performing a second particular embodiment of a method 20 forming the subject matter of the present invention.

An image capture device 205 comprises image capture means 210. The image capture device 205 is a digital still camera, a digital camera integrated in a communicating portable terminal, or a digital movie camera, for example. The image capture means 210 are a light-sensitive electronic component converting electromagnetic radiation, such as ultraviolet, infrared, or wavelengths visible to the human eye, for example, into an analog electrical signal representative of a digital image. The image capture means 210 include a CCD (acronym of "Charge-Coupled Device") or a CMOS (acronym of "Complementarity Metal-Oxide-Semiconductor") sensor, for example. The image capture means 210 may comprise a plurality of image sensors.

The image capture device 205 comprises selection means 300 for selecting a capture mode 200 of an image signal, 215 or 220. The capture mode 200 for capturing an image signal, 215 or 220, is selected manually by a user of the device 205 or automatically by the device 205. Selecting the capture mode 200 for capturing an image signal may be performed according to an exposure measurement. Selecting the capture mode 200 for capturing an image signal, 215 or 220, may be performed according to a focusing measurement. Preferably, the capture mode 200 is selected by a user. Parameters, such as an effect selected on the image signal, 215 or 220, by the user, the exposure, or the number of image signals may be automatically selected according to the scene to be captured. Notably, according to a lighting of a scene, a movement in the scene, or a distance between objects in the scene.

The capture mode for capturing an image signal 200 comprises exposure and/or focusing parameters for each image signal, 215 or 220.

The capture mode may be at least one of the following elements:
  a number of image signals, 215 and 220, and/or
  an effect on the image signal, 215 or 220, selected by a user, such as:
    a noise reduction of at least one image signal, 215 or 220, by fusion of image signals, 215 or 220, of the same exposure with anti-ghost, for example,
    a dynamic increase of at least one image signal, 215 or 220, by fusion of image signals, 215 and 220, of a different exposure with anti-ghost, for example,
    an increase or decrease of a depth of field, by fusion of image signals, 215 and 220, of a different focusing distance and/or aperture with anti-ghost, for example,
    if the scene comprises at least one face, an increase in the quality of at least one image signal, 215 or 220, at each face, by facial analysis and selecting between at least two image signals, 215 and 220, of each face according to detection of a smile and detection of the eyes being open and/or;
    a movement breakdown effect, by analysis of an object displacement between at least two image signals, 215 and 220, and selecting the differences between each image signal, 215 and 200, for saving the background of one of the images represented by the image signals, 215 and 220, at the locations or the object is absent in all the images and the object when it is present in one of the images and/or
  a variation in the exposure parameters from one image signal, 215 or 220, to another image signal, 215 or 220, such as:
    the activation of a photographic flash for obtaining low noise in at least one image signal, 215 or 220, or the deactivation of a photographic flash for obtaining a better rendering of colors in at least one image signal, 215 or 220,
    maintaining the same exposure for applying a TNR algorithm configured for reducing the noise by increasing the dynamic of an image signal, 215 or 220, in a limited way and;
    applying exposure compensation (or "EV bias") for applying an HDR algorithm configured for increasing the dynamic of an image signal, 215 or 220; and/or
  a variation in the focusing parameters between the capture of one image signal, 215 or 220, and the capture of a successive image signal, 215 or 220, such as:
    a variation in the focusing distance, for a fusion algorithm configured for increasing or decreasing a depth of field, for example, and/or
  selecting a "reference" image signal, 215 or 220, for the fusion of the image signals, 215 and 220.

The image signal, 215 or 220, captured by the image capture means 210 is an image signal in a RAW format. Preferably, the RAW format of the image signals, 215 and 220, is a DNG format. The image signal, 215 or 220, captured by the image capture means 210 is captured according to the selected capture mode 200.

At least two image signals, 215 or 220, are captured. Preferably each image signal, 215 or 220, is captured successively to the preceding one from the capture of the first image signal, 215 or 220. For example, the image signal 215 is captured first then the image signal 220 is captured. The number of image signals, 215 or 220, captured is two or four, for example.

Preferably, the interval between two image signals, 215 and 220, captured successively is less than one-fifteenth of a second. In some embodiments, the interval between two image signals, 215 and 220, captured successively is less than one-sixtieth of a second. The shorter the interval the more the movement of the scene and a user may be minimized.

A file 225 comprising each captured image signal, 215 and 220n is created. The file 225 is in a standardized format. Preferably, the standardized format is the DNG format. The created file 225 comprises metadata 230, such as EXIF (acronym of "Exchangeable Image File Format") metadata.

The metadata 230 of the DNG format of the file 225 include parameters of an image. Preferably, metadata specific to each image signal, 215 and 220, are added to the metadata of the created file 225. The added metadata 230 are the shutter speed, aperture and gain parameters, for example.

In the embodiments in which the file 225 is in the DNG format, an image signal, 215 or 220, may be selected as the reference image signal in the course of a selection step 16-2 for selecting a reference image signal.

Each supplementary image signal, 215 or 220, may be a signal representative of a miniaturized image of the reference image signal, 215 or 220, or an image signal, 215 or 220, at least partially different from the reference image signal, 215 or 220.

Each image signal, 215 or 220, supplementary to the reference image signal, 215 or 220, is stored in a subIFD tag of the metadata 230 of the file 225.

Each image signal, 215 or 220, supplementary to the reference image signal, 215 or 220, may have different shooting parameters from the reference image signal, 215 or 220. The shooting parameters are the exposure time, the sensitivity of the image sensor 205 and/or the aperture of the image sensor 205, for example. The shooting parameters are stored in the metadata 230 of the file 225.

In embodiments in which each image signal, 215 or 220, supplementary to the image signal, 215 or 220, has the same shooting parameters as the reference image signal, 215 or 220, the image signals, 215 and 220, may share the same metadata 230 concerning the shooting.

In embodiments in which at least one supplementary image signal, 215 or 220, has different shooting parameters from the reference image signal, 215 or 220, each piece of information representative of the shooting parameters of each image signal, 215 or 220, may be stored in the metadata 230 of the file 225. Each piece of information representative of the shooting parameters of each image signal, 215 or 220, is preferably stored in a MakerNote tag.

In some embodiments, the metadata 230 of the file 225 include a look-up table (or LUT, acronym of Look-Up Table) for each image signal, 215 and 220, of the file 225. Each look-up table is a table defining a decompression of each image signal, 215 or 220. Preferably, the look-up table of the reference image signal, 215 or 220, is stored in an EXIF tag referred to as a RawLinearizationLUT. Each look-up table of each supplementary image signal, 215 or 220, is stored in a MakerNote tag.

Once the file 225 is created, the file 225 is stored 13. The file 225 may be stored 14, or recorded, in storage means 310 included in an image capture device 205. In some embodiments, the file 225 is stored by means of a telecommunication network or connection means. The telecommunication network may be:
- a Bluetooth (registered trademark) network,
- a WiFi (acronym of "Wireless Fidelity", registered trademark) network,
- a mobile telephony network or
- an NFC (acronym of "Near Field Communication") network, for example.

The connections means may be:
- a USB connector,
- a Lightning (registered trademark) connector or
- a micro-USB connector, for example.

The file 225 may be transmitted to image processing means. The transmission may be:
- a transmission by FTP ("File Transfer Protocol"),
- a transmission by mobile telephony network,
- a transmission by a Bluetooth (registered trademark) network,
- a transmission by a WiFi (acronym of "Wireless Fidelity", registered trademark) network,
- a transmission by a USB connector,
- a transmission by a Lightning connector or
- a transmission by an NFC (acronym of "Near Field Communication") network, for example.

The stored file 235 is an untransformed file. The stored file 235 may be useful for subsequent manipulations.

The created file 225 is transmitted to digital processing means 320. The created file 225 is processed according to the steps of processing 16, choosing 16-1, selecting a reference image signal 16-2, fusing 16-3, saving 16-4 of information representative of the fusing 16-3, saving 16-5 of information representative of the processing 16 according to the embodiments described in the description of FIG. 1, according to the selected capture mode.

In these embodiments, the file 225 is modified after fusing. The file modified after fusing may comprise at least one ghost image, for example. The new metadata 230, comprise information on the capture mode for capturing the captured image signals, 215 and 220. And the metadata 230 are enriched with at least one piece of information representative of the processing 16 and fusing 16-3. Preferably, all the information representative of the processing 16 and fusing 16-3 is saved.

The fused and processed image signal 255 may be subjected to a TNR (acronym of "Temporal Noise Reduction") noise reduction and HDR (acronym of "High Dynamic Range") high dynamic range processing, for example.

A local tone mapping step 16-6 is implemented on the processed and fused image signal 255. The color palette of the modified image signal is mapped with a color palette, such as the color palette of an RGB (acronym of "Red, Green, Blue") format. Such a step makes it possible to convert a high dynamic range image to a more limited dynamic image. The image signal 260 derived from the local tone mapping is transformed into a digital image 265. The digital image 265 is in a format that is displayable on a digital screen, such as a JPEG, TIFF or PNG format, for example.

The created file 225 may be modified simultaneously by another method 270 of modifying such a file and end in the production of a different image from the file 225. The method 270 may comprise similar steps to the steps of the method 10.

Figure 3:
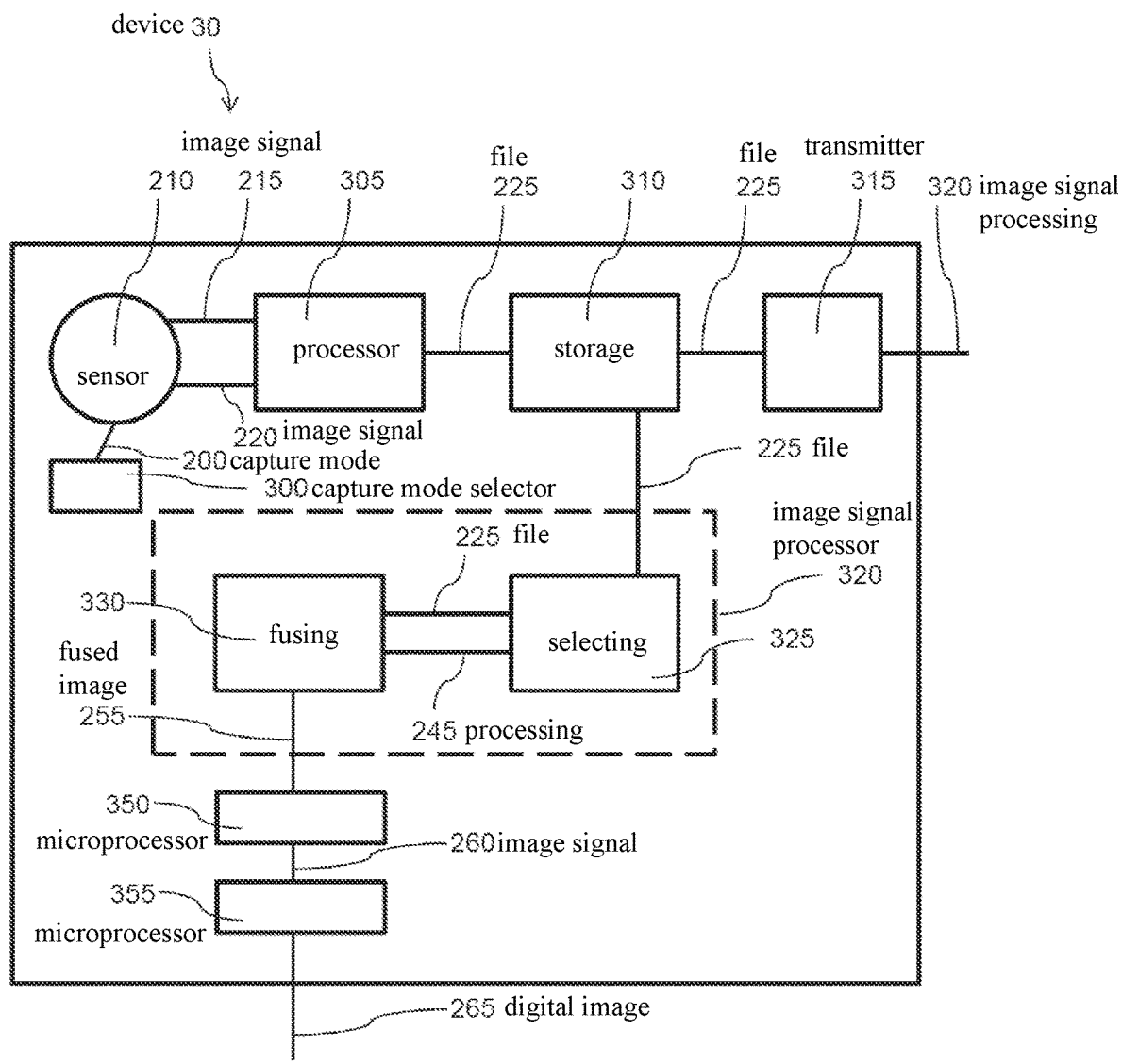
FIG. 3 represents, schematically, a first embodiment of a device forming the subject matter of the present invention.

FIG. 3 depicts a particular embodiment of a method 30 forming the subject matter of the present invention.

The device 30 for producing a digital image 265 comprises:
- selection means 300 for selecting at least one capture mode 200 for capturing at least two image signals, 215 or 220, from an image capture device 210,
- an image capture device 210, capturing at least at least two image signals, 215 and 220, representative of the same scene in a RAW format, each image signal, 215 or 220, being captured according to the image capture mode 200,
- creation means 305 for creating a file 225 in a standardized format comprising each image signal, 215 and 220, and metadata 230 representative of the capture mode 200,
- storage means 310 for storing the created file 225,
- digital processing means 320 for processing the created file 225 comprising the following substeps:
  - choosing means 325 for choosing at least one processing algorithm 245 for processing at least two image signals, 215 or 220, according to the metadata 230 representative of the capture mode 200,
  - fusion means 330 for fusing at least two image signals according to each chosen image processing algorithm 245 into a signal representative of a fused digital image 255.

The device 30 comprises selection means 300 for selecting a capture mode 200 of an image signal, 215 or 220. The capture mode 200 for capturing an image signal, 215 or 220, is selected manually by a user of the device 205 or automatically by the device 205. Selecting the capture mode 200 for capturing an image signal may be performed according to an exposure measurement. The device 30 may comprise exposure measurement means. Selecting the capture mode 200 for capturing an image signal, 215 or 220, may be performed according to a focusing measurement. The device 30 may comprise focusing measurement means. Preferably, the capture mode 200 is selected by a user. Parameters, such as an effect selected on the image signal, 215 or 220, by the user, the exposure, or the number of image signals may be automatically selected according to the scene to be captured. Notably, according to the lighting, the movement in the scene, or the distance between objects in the scene.

The capture mode for capturing an image signal 200 comprises exposure and/or focusing parameters for each image signal, 215 or 220.

The capture mode may be at least one of the following elements:

a number of image signals, 215 and 220, and/or
an effect on the image signal, 215 or 220, selected by a user, such as
- a noise reduction of at least one image signal, 215 or 220, by fusion of image signals, 215 or 220, of the same exposure with anti-ghost, for example,
- a dynamic increase of at least one image signal, 215 or 220, by fusion of image signals, 215 and 220, of a different exposure with anti-ghost, for example,
- an increase or decrease of a depth of field, by fusion of image signals, 215 and 220, of a different focusing distance and/or aperture with anti-ghost, for example,
- if the scene comprises at least one face, an increase in the quality of at least one image signal, 215 or 220, at each face, by facial analysis and selecting between at least two image signals, 215 and 220, of each face according to detection of a smile and detection of the eyes being open and/or;
- a movement breakdown effect, by analysis of an object displacement between at least two image signals, 215 and 220, and selecting the differences between each image signal, 215 and 200, for saving the background of one of the images represented by the image signals, 215 and 220, at the locations or the object is absent in all the images and the object when it is present in one of the images and/or a variation in the exposure parameters from one image signal, 215 or 220, to another image signal, 215 or 220, such as:
- the activation of a photographic flash for obtaining low noise in at least one image signal, 215 or 220, or the deactivation of a photographic flash for obtaining a better rendering of colors in at least one image signal, 215 or 220,
- maintaining the same exposure for applying a TNR algorithm configured for reducing the noise by increasing the dynamic of an image signal, 215 or 220, in a limited way and;
- applying exposure compensation (or "EV bias") for applying an HDR algorithm configured for increasing the dynamic of an image signal, 215 or 220; and/or a variation in the focusing parameters between the capture of one image signal, 215 or 220, and the capture of a successive image signal, 215 or 220, such as:
- a variation in the focusing distance, for a fusion algorithm configured for increasing or decreasing a depth of field, for example, and/or selecting a "reference" image signal, 215 or 225, for the fusing step 16-3.

The device 30 for producing a digital image 265 comprises image capture means 210. The image capture means 210 may be included in an image capture device 205. The image capture device 205 is a digital still camera, a digital camera integrated in a communicating portable terminal, or a digital movie camera, for example.

The image capture means 210 are a light-sensitive electronic component converting electromagnetic radiation, such as ultraviolet, infrared, or wavelengths visible to the human eye, for example, into an analog electrical signal representative of a digital image. The image capture means 210 comprise a CCD (acronym of "Charge-Coupled Device") or a CMOS (acronym of "Complementarity Metal-Oxide-Semiconductor") sensor, for example. The image capture means 210 may comprise a plurality of image sensors.

The image signal, 215 or 220, captured by the image capture means 210 is an image signal in a RAW format. Preferably, the RAW format of the image signals, 215 and 220, is a DNG format.

At least two image signals, 215 or 220, are captured. Preferably each image signal, 215 or 220, is captured successively to the preceding one from the capture of the first image signal, 215 or 220. For example, the image signal 215 is captured first then the image signal 220 is captured. The number of image signals, 215 or 220, captured is two or four, for example.

Preferably, the interval between two image signals, 215 and 220, captured successively is less than one-fifteenth of a second. In some embodiments, the interval between two image signals, 215 and 220, captured successively is less than one-sixtieth of a second. The shorter the interval the more the movement of the scene and a user may be minimized.

In some embodiments, the image signals, 215 and 220, are captured by at least two image sensors. The image signals, 215 or 220, may be captured by at least two image sensors and successively in time.

The creation means 305 for creating a file 225 in a standardized format comprising each captured image signal, 215 and 220, and metadata 230 perform the creation step 12 of the method 10. The creation means 305 are a microprocessor, for example. The file 225 comprising each captured image signal, 215 or 220, is created by the creation means 305. The file 225 is in a standardized format. Preferably, the standardized format is the DNG format. The created file 225 comprises metadata 230, such as EXIF (acronym of "Exchangeable Image File Format") metadata.

The metadata 230 of the DNG format of the file 225 include parameters of an image. Preferably, metadata specific to each image signal, 215 and 220, are added to the metadata of the created file 225. The added metadata 230 are the shutter speed, aperture and gain parameters, for example.

In the embodiments in which the file 225 is in the DNG format, an image signal, 215 or 220, may be selected as the reference image signal in the course of a selection step 16-2 for selecting a reference image signal.

Each supplementary image signal, 215 or 220, may be a signal representative of a miniaturized image of the reference image signal, 215 or 220, or an image signal, 215 or 220, at least partially different from the reference image signal, 215 or 220.

Each image signal, 215 or 220, supplementary to the reference image signal, 215 or 220, is stored in a subIFD tag of the metadata 230 of the file 225.

Each image signal, 215 or 220, supplementary to the reference image signal, 215 or 220, may have different shooting parameters from the reference image signal, 215 or 220. The shooting parameters are the exposure time, the sensitivity of the image sensor 205 and/or the aperture of the image sensor 205, for example. The shooting parameters are stored in the metadata 230 of the file 225.

In embodiments in which each image signal, 215 or 220, supplementary to the image signal, 215 or 220, has the same shooting parameters as the reference image signal, 215 or 220, the image signals, 215 and 220, may share the same metadata 230 concerning the shooting.

In embodiments in which at least one supplementary image signal, 215 or 220, has different shooting parameters from the reference image signal, 215 or 220, each piece of information representative of the shooting parameters of each image signal, 215 or 220, may be stored in the metadata 230 of the file 225. Each piece of information representative of the shooting parameters of each image signal, 215 or 220, is preferably stored in a MakerNote tag.

In some embodiments, the metadata 230 of the file 225 include a look-up table (or LUT, acronym of Look-Up Table) for each image signal, 215 and 220, of the file 225. Each look-up table is a table defining a decompression of each image signal, 215 or 220. Preferably, the look-up table of the reference image signal, 215 or 220, is stored in an EXIF tag referred to as a RawLinearizationLUT. Each look-up table of each supplementary image signal, 215 or 220, is stored in a MakerNote tag.

The storage means 310 for storing the created file 225 are mass storage means, such as a hard disk or a memory card, for example, or a Cloud storage space.

In some embodiments, the storage means 310 are external and the storage is performed by means of a telecommunication network or connection means. The telecommunication network may be:
- a Bluetooth (registered trademark) network,
- a WiFi (acronym of "Wireless Fidelity", registered trademark) network,
- a mobile telephony network or
- an NFC (acronym of "Near Field Communication") network, for example.
- a USB connector,
- a Lightning (registered trademark) connector or
- a micro-USB connector, for example.

The device 30 may comprise transmission means 315 for transmitting the created file. The transmission means 315 may be:
- transmission means by FTP ("File Transfer Protocol"),
- a transmission by mobile telephony network,
- a transmission by a Bluetooth (registered trademark) network,
- transmission means by a WiFi (acronym of "Wireless Fidelity", registered trademark) network,
- transmission means by a USB connector,
- transmission means by a Lightning connector or
- transmission means by an NFC (acronym of "Near Field Communication") network, for example.

The stored file 235 in the storage means 310 is an untransformed file. The stored file 235 may be useful for subsequent manipulations.

The digital modification means 320 for modifying the created file 225 are a microprocessor implementing at least one digital processing algorithm for processing an image signal.

The digital processing means 320 comprise:
choosing means 325 for choosing at least one processing algorithm 245 for processing at least one image signal, 215 or 220, according to the metadata 230 representative of the capture mode 200,
fusion means 330 for fusing at least two image signals, 215 and 220, according to each chosen image processing algorithm 245 into a signal representative of a fused digital image 255.

The modification means 320 may comprise means for:
choosing at least one part of an image signal, 215 or 220, of a file 225 to be fused with one part of another image signal, 215 or 220, of the same file 225,
after fusing, saving at least one piece of information representative of the fusing 16-3 performed, in the created file 225 and
after processing, saving at least one piece of information representative of the processing 16 performed, in the created file 225.

The choosing means 325 for choosing at least one algorithm for processing 245, fusion 330, saving fusion and processing information preferably implement steps 16-1, 16-3, 16-4, 16-5, in accordance with the method for producing an image, 10 or 20.

In these embodiments, the file 225 is modified after fusing. The file modified after fusing may comprise at least one ghost image, for example. The new metadata 230, comprise information on the capture mode for capturing the captured image signals, 215 and 220. And the metadata 230 are enriched with at least one piece of information representative of the processing 16 and fusing 16-3. Preferably, all the information representative of the processing 16 and fusing 16-3 is saved.

The processing means 320 are preferably an ISP (acronym of "Image Signal Processor").

The processing means 320 may comprise selection means for selecting a "reference" image signal from the captured image signals on which at least one other image signal is fused. Preferably, selecting a reference image signal is subsequent to capture and prior to fusion.

The processing means 330 may comprise TNR (acronym of "Temporal Noise Reduction") noise reduction and HDR (acronym of "High Dynamic Range") high dynamic range means performed on the fused and processed image signal 255.

The device 30 may comprise local tone mapping means 350 for mapping the modified digital image signal 255. The local tone mapping means 350 are a microprocessor implementing a tone mapping algorithm in accordance with step 16 of the method 10. In some embodiments, the local tone mapping means 350 comprise image processing means.

The device 30 may comprise transformation means 355 for transforming the image signal 260, at the output of the local tone mapping means 350, into a digital image 265. The digital image 265 is in a format that is displayable on a digital screen, such as a JPEG, TIFF or PNG format, for example. The transformation means 355 are preferably a microprocessor implementing a transformation algorithm corresponding to step 17 of the method 10.

The invention claimed is:

1. A method for automatically producing a digital image, comprising steps of:
    selecting at least one capture mode to capture at least two raw signals, each raw signal representative of a digital image from an image capture device;
    capturing by the image capture device of said at least two raw signals representative of digital images of a same scene in a RAW format, said each raw signal representative of the digital image being captured according to said at least one image capture mode;
    generating a file in a standardized format comprising said each raw signal representative of the digital image and metadata representative of said at least one capture mode;
    storing the generated file;
    digital processing of the generated file by:
        selecting at least one processing algorithm to process said at least two raw signals representative of the digital images according to the metadata representative of said at least one capture mode; and
        fusing said at least two raw signals representative of the digital images according to said at least one image processing algorithm into a signal representative of a fused digital image.

2. The method as claimed in claim 1, wherein said at least one capture mode is selected manually by a user of the image capture device or automatically according to at least one of an exposure measurement and a focusing measurement by the image capture device, said at least one capture mode comprising at least one of exposure and focusing parameters for said each raw signal.

3. The method as claimed in claim 1, wherein said at least one capture mode is selected from at least one element of the following group:
- a noise reduction using said at least two raw signals;
- a dynamic increase using at said least two raw signals;
- an increase or decrease of a depth of field using said at least two raw signals;
- an increase in quality at each face using said at least two raw signals in response to a determination that the same scene comprises at least one face; and
- a movement breakdown represented in said at least two raw signals.

4. The method as claimed in claim 1, further comprising a selection step for selecting a raw signal representative of a reference image from said at least two raw signals representative of the digital images captured from the image capture device; and subsequent to the step of capturing, at least one other raw signal representative of an image is fused on said raw signal representative of the reference image.

5. The method as claimed in claim 1, wherein said at least two raw signals representative of the digital images are captured successively.

6. The method as claimed in claim 1, wherein the standardized format of the generated file is based on a digital negative (DNG) format.

7. The method as claimed in claim 1, further comprising a step of transmitting the generated file.

8. A device to automatically produce a digital image, comprising:
- an input device to select at least one capture mode to capture at least two raw signals, each raw signal representative of a digital image from an image capture device;
- the image capture device configured to capture said at least two raw signals representative of the digital images of a same scene in a RAW format, said each raw signal representative of the digital image being captured according to said at least one image capture mode;
- a processor configured to generate a file in a standardized format comprising said each raw signal representative of the digital image and metadata representative of said at least one capture mode;
- a storage to store the generated file; and
- an image signal processor configured to process the generated file by:
  - selecting at least one processing algorithm to process said at least two raw signals representative of the digital images according to the metadata representative of said at least one capture mode; and
  - fusing said at least two raw signals representative of the digital images according to said at least one image processing algorithm into a signal representative of a fused digital image.

9. The device as claimed in claim 8, further comprising a transmitter configured to transmit the generated filed.

10. The device as claimed in claim 8, wherein the input device is at least one of the following: a keyboard, a mouse and a touchscreen.

* * * * *